United States Patent
Fenioux et al.

(10) Patent No.: US 7,500,416 B2
(45) Date of Patent: Mar. 10, 2009

(54) VIBRATION FILTER FOR A TRANSMISSION WITH AUTOMATIC, CONTINUOUS OR DISCONTINUOUS, GEARCHANGE, ESPECIALLY FOR A MOTOR VEHICLE

(75) Inventors: Daniel Fenioux, Saleux (FR); Gino Villata, Buttigliera d'Asti (IT); Jon Rost, Livonia, MI (US); Michel Ginaldi, Ann Arbor, MI (US); Pierre Quenioux, Farmington Hills, MI (US)

(73) Assignee: Valeo Embrayages, Amiens Cedex 2 (FR)

( * ) Notice: Subject to any disclaimer, the term of this patent is extended or adjusted under 35 U.S.C. 154(b) by 117 days.

(21) Appl. No.: 11/641,650

(22) Filed: Dec. 20, 2006

(65) Prior Publication Data
US 2007/0151918 A1    Jul. 5, 2007

(51) Int. Cl.
*F16F 15/16* (2006.01)
(52) U.S. Cl. .................................. 74/573.12
(58) Field of Classification Search ............ 74/572.2, 74/573.1, 573.12, 574.4; 464/51, 68.4, 68.41, 464/68.8; 267/196
See application file for complete search history.

(56) References Cited

U.S. PATENT DOCUMENTS

| | | | |
|---|---|---|---|
| 5,771,756 A | 6/1998 | Mokdad | |
| 5,797,297 A | 8/1998 | Mokdad | |
| 5,934,654 A | 8/1999 | Mokdad | |
| 6,062,103 A | 5/2000 | Soares et al. | |
| 6,287,205 B1 | 9/2001 | Bonfilio et al. | |
| 6,668,995 B2 * | 12/2003 | Ginder et al. | 192/55.4 |
| 6,840,364 B2 * | 1/2005 | Reik et al. | 192/85 C |
| 2005/0028638 A1 * | 2/2005 | Fenioux et al. | 74/574 |

FOREIGN PATENT DOCUMENTS

| | | |
|---|---|---|
| FR | 2 518 203 | 6/1983 |
| FR | 2 778 441 | 11/1999 |
| FR | 2 816 679 | 5/2002 |
| JP | 07-224893 | 8/1995 |

* cited by examiner

*Primary Examiner*—Vicky A Johnson
(74) *Attorney, Agent, or Firm*—Berenato, White & Stavish

(57) ABSTRACT

In a vibration filter for a transmission with automatic gear changing for a motor vehicle, including a torsion damper disposed between an input or driving element arranged to be driven in rotation by the crankshaft of the motor vehicle engine, and an output or driven shaft arranged to be coupled to an input shaft or driven shaft of the transmission, the torsion damper includes elastic means: the stiffness of the damper is variable and is obtained by virtue of the said elastic means, which are in the form of helical springs oriented substantially radially; the input element is a primary flywheel (10) which has at its radially inner periphery an axial flange (12) for supporting a bearing (13) which centers and guides in rotation a secondary inertial flywheel (20) constituting the output element.

12 Claims, 20 Drawing Sheets

VIBRATION FILTER FOR A TRANSMISSION WITH AUTOMATIC, CONTINUOUS OR DISCONTINUOUS, GEARCHANGE, ESPECIALLY FOR A MOTOR VEHICLE

BACKGROUND OF THE INVENTION

The present invention relates to a vibration filter for a transmission with automatic, continuous or discontinuous, gearchange, especially for a motor vehicle.

Transmissions with automatic gearchange, especially for motor vehicles, generally comprise a hydraulic torque converter which is effective in filtering out the vibrations which are produced by the explosions taking place in the engine, and which, carrying the starter crown, multiplies the starting torque because of its reactor.

SUMMARY OF THE INVENTION

The object of the present invention is to propose a vibration filter for a transmission of the kind referred to above, the efficiency is as good as that of a hydraulic torque converter without the disadvantages of the latter, namely, in particular, size, mass and high inertia leading to an increase in fuel consumption and a loss in performance, and cost. The proposed filter is of simple construction, the torque multiplication function being incorporated in the first gear ratio which is chosen to be short, which is even easier to achieve the more the number of automatic transmission ratios is increased (six-speed gearboxes).

According to the invention, a filter for a motor vehicle transmission with automatic gearchange, including a torsion damper disposed between an input or driving element which is adapted to be driven in rotation by the crankshaft of the engine of the motor vehicle, and an output or driven element which is adapted to be coupled to an input shaft of the transmission or driven shaft, which torsion damper includes elastic means, is characterised by the fact that the stiffness of the damper is variable.

Preferably, the variable stiffness is obtained with resilient means in the form of helical springs oriented substantially radially.

Preferably, the input element is a primary flywheel which has at its radially inner periphery an axial flange for supporting a bearing that provides centring and guiding in rotation for a secondary inertia flywheel constituting the output element.

Advantageously, the primary flywheel is coupled to the driving shaft through a damper plate which is fixed with respect to the driving shaft at the end of the latter.

Preferably, the primary flywheel is fixed on the damper plate by means of screws which are fitted on the same side as the driving shaft.

In one embodiment, the filter constitutes a sub-assembly secured by screws to a damper plate, which is itself fixed with respect to the driving shaft at the end of the latter, the said screws being fitted on the same side as the driven shaft.

Preferably, the primary flywheel is fixed on the damper plate by means of screws mounted on the side of the driven shaft; in another version, a disc is applied, firstly to the primary flywheel, and secondly to a damper plate which is coupled to the driving shaft and centred with respect to the latter; the damper plate has a central bore adapted to receive a nose of the disc for centring the driven shaft.

Preferably, the end of the driven shaft on the engine side is centred and guided by means of a pilot bearing with respect to the driving shaft.

Advantageously, the secondary flywheel has a central hub for coupling to the driven shaft, which hub is centred only by the driven shaft.

Preferably, the helical springs are mounted on rods, the outer ends of which include abutment seatings for the springs, with their inner ends being articulated on pivot pins constituting the output means of the torsion damper; the helical springs are contained in cans, the outer ends of which are articulated on pivot pins constituting the input means of the torsion damper; one end of the input pivot pins is supported by an annular so-called primary cover plate.

Advantageously, a torque limiter is disposed between the torsion damper and the output or driven element.

Preferably, the torque limiter couples the output pivot pins of the torsion damper with the output element of the filter; the output element is a secondary inertia flywheel and the torque limiter includes a spring ring carried by the secondary flywheel, which exerts an axial biasing action on a friction ring on the face of the secondary flywheel that faces towards the primary flywheel, through an application ring; the secondary flywheel carries a central hub for coupling it to the driven shaft, the centring and guiding bearing being disposed radially between the said hub and the axial flange of the primary flywheel.

Advantageously, the friction ring carries the output pivot pins of the torsion damper.

Preferably, the torsion damper includes friction means.

Advantageously, the output pivot pins of the torsion damper constitute means for driving in rotation friction rings which are applied elastically against the face of the primary flywheel which faces towards the secondary flywheel.

Preferably, the secondary flywheel is limited to a hub having a collar portion or radial arms which are coupled to the output pivot pins.

Advantageously, the friction ring of the torsion damper is fixed to the hub at the end of the output pivot pins.

Preferably, the collar portion of the hub has notches at its outer periphery, with which radial lugs of a primary cover plate, for limiting the circumferential displacement between the output pivot pins and primary flywheel, are in cooperation.

Advantageously, the collar portion of the hub is mounted elastically with respect to the said hub; the hub collar portion is formed with a set of teeth, in mesh with a set of outer teeth of the hub, the other teeth being extended radially outwards so as to constitute fingers which are gripped elastically between the collar portion and a resilient ring applied and secured to the collar portion.

Advantageously, the collar portion is in line with the rods of the torsion damper, and the torque limiter consists of two transverse rings lying axially on either side of the collar portion and assembled together by means of two axial short posts, the friction ring of the torque limiter being disposed between the collar portion and one of the transverse rings, the spring ring being placed between the friction ring and the said transverse ring.

Advantageously, the torque limiter comprises discs which are coupled in rotation alternately, one to the collar portion and the next to the hub, the friction ring being driven in rotation by a sleeve which is itself driven by the inner ends of the rods.

Preferably, the disc and a closure cover plate, secured sealingly to a central sleeve, define a closed volume.

Advantageously, the input or driving element drives an accessory such as an oil pump.

In another version, it is the output or driven element that drives an accessory such as an oil pump.

Advantageously, the accessory is used for braking the output or driven element.

BRIEF DESCRIPTION OF THE DRAWINGS

In order that the invention shall be understood more clearly, embodiments thereof shown in the attached drawings will now be described, by way of example and purely by way of illustration without limitation.

In the drawings.

DESCRIPTION OF A PREFERRED EMBODIMENT

Figure 1:
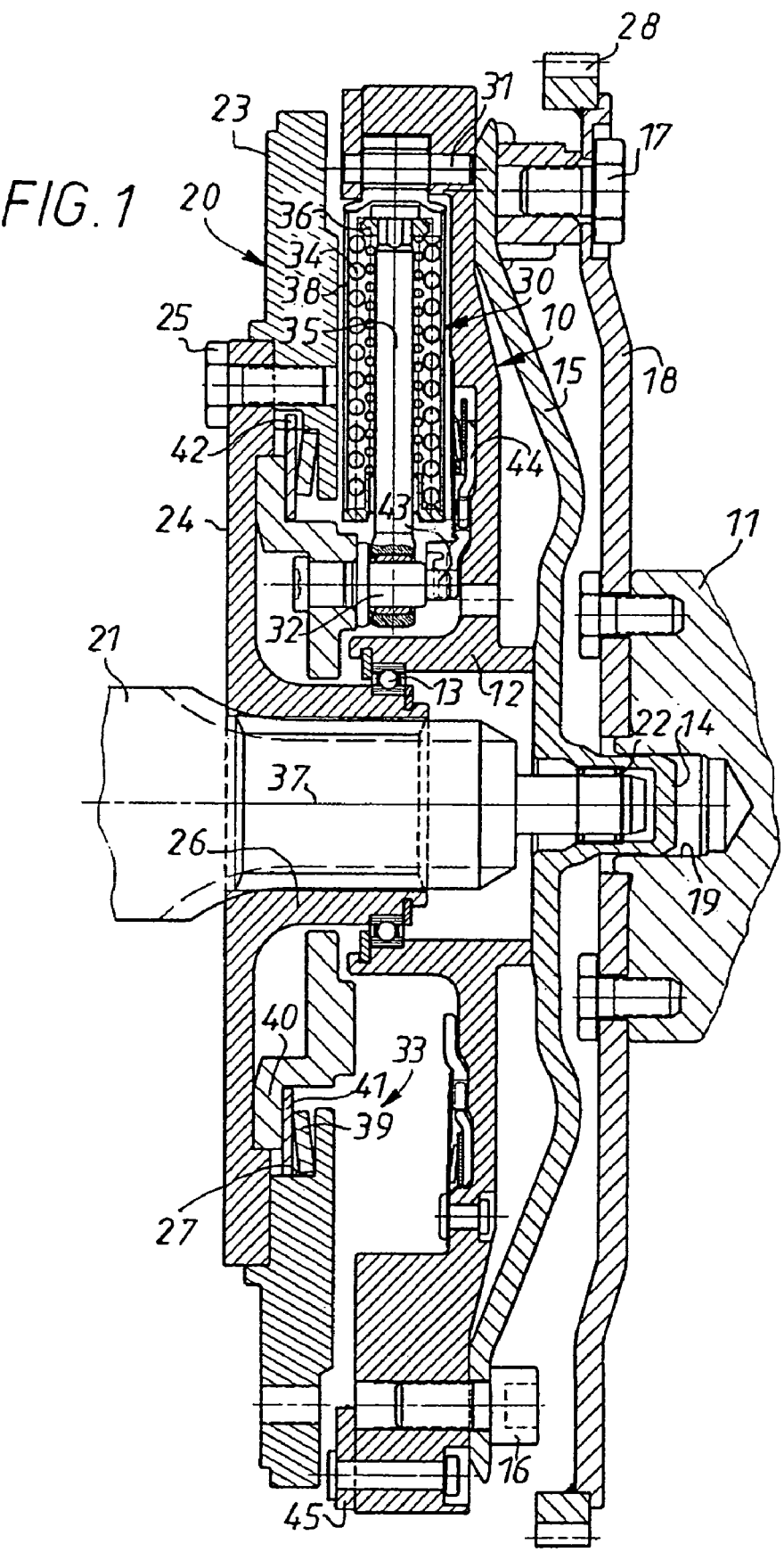
FIG. 1 is an axial cross section of a filter according to the invention.

The filter in FIG. 1 includes an input element which is a so-called primary inertia flywheel 10 adapted to be fixed on the end of a driving shaft 11 such as the crankshaft of an internal combustion engine. In the following description and for all the other versions, for reasons of convenience, the input element of the filter will be called the primary flywheel whether the input element has a high inertia or a low one.

At its radially inner periphery, the primary flywheel 10 has an axial flange 12 for supporting a bearing 13, which in this example is a ball bearing that centres and guides in rotation the output element of the damper, which is a so-called secondary inertia flywheel 20 coupled to a driven shaft 21, such as the input shaft of a transmission, the end of which on the engine side is centred and guided by means of a pilot bearing 20 arranged in the nose 14 of a disc 15 which constitutes a cover plate, which is attached peripherally, firstly by means of screws 16 to the primary flywheel 10, and secondly by means of screws 17 to a damper plate 18, which in turn is secured by means of screws to the end of the crankshaft 11, the latter having a central bore 19 in which the nose 14 of the disc 15 is partially engaged. It is the damper plate 18 that carries the starter crown 28 at its periphery. In the following description, and in respect of all the other versions, for reasons of convenience, the output element of the filter will be called the secondary flywheel, whether the output element is of high or low inertia.

A torsion damper 30 is mounted between the primary flywheel 10 and secondary flywheel 20; it comprises input means 31 fixed with respect to the primary flywheel 10, together with output means 32 which are coupled to the secondary flywheel 20 by means of a torque limiter 33.

The torsion damper 30 comprises deformable elastic elements such as elical springs 34, oriented substantially radially, which are mounted on rods 35, the radially outer ends of which include abutment seatings 36 for the springs 34, with their radially inner ends being articulated on pivot pins 32 which constitute the output means of the torsion damper 30 and which are parallel to the axis of rotation 37 of the filter.

The springs 34 mounted on the rods 35 are contained in cylindrical cans 38, the radially outer ends of which are articulated on pivot pins 31 that constitute the input means of the torsion damper 30 and extend parallel to the axis of rotation 37. One end of these pivot pins 31 is supported by an annular so-called primary cover plate 45, while the other end of the pivot pins 31 is supported by the primary flywheel 10. In the known way, relative rotation between the primary flywheel 10 and secondary flywheel 20 causes an increase to occur in the distance between the pivot pins 31 and 32, with compression of the springs 34.

The torque limiter 33 consists essentially of a spring ring 39, carried by the secondary flywheel 20 and axially biasing a friction ring 40 on the face of the secondary flywheel 20 that faces towards the primary flywheel 10, through an interposed application ring 41.

In this example, the secondary flywheel 20 is in two parts, namely a so-called outer part 23 and a so-called inner part 24, which are assembled together by means of screws 25; it is with the face turned towards the primary flywheel 10 of the inner part 24 that the friction ring 40 is in frictional cooperation; the inner part 24 carries a central hub 26 which is splined internally for coupling it to the driven shaft 21; it is between the axial flange 12 of the primary flywheel 10 and the hub 26 that the centring and guiding bearing 13 is radially disposed.

The spring ring 39 and the application ring 41 are mounted in a rebate 27 in the outer part 23 of the secondary flywheel 20, which rebate 27 is open towards the inner part 24 of that flywheel.

The friction ring 40 carries the output pins 32 which are riveted to it; it extends radially between the hub 26 of the inner part 24 and the outer part 23.

The application ring 41 has at least one radial lug 42 projecting into a notch formed at the inner periphery of the outer part 23 of the secondary flywheel 20, whereby to couple the application ring 40 to the secondary flywheel 20 for rotation together.

The ends 43 of the output pins 32 which are opposite the friction ring 40 of the torque limiter 33 constitute rotational driving means for at least one friction ring 44 of the torsion damper 30, which is applied, in the known way, by means of a spring ring on the face of the primary flywheel 10 that faces on the side of the secondary flywheel 20.

Operation is as follows.

The primary flywheel 10, driven in rotation by the driving shaft 11, transmits a rotational torque to the secondary flywheel 20 through the torsion damper 30, the elastically deformable members 34 and friction ring 44 of which absorb and damp out the vibrations and irregularities in the torque transmitted by the shaft 11. The axial application force of the friction ring 40 on the secondary flywheel 20 determines the value of the torque from which a rotational sliding movement of the ring 40 on the secondary flywheel 20 is produced. This force is determined in such a way as to permit the maximum torque supplied by the engine, which drives the shaft 11, to be transmitted, and to avoid transmission of high-energy irregularities or vibrations which are caused by resonance at a certain speed of rotation, and which are liable to damage or destroy some components of the transmission.

Figure 2:
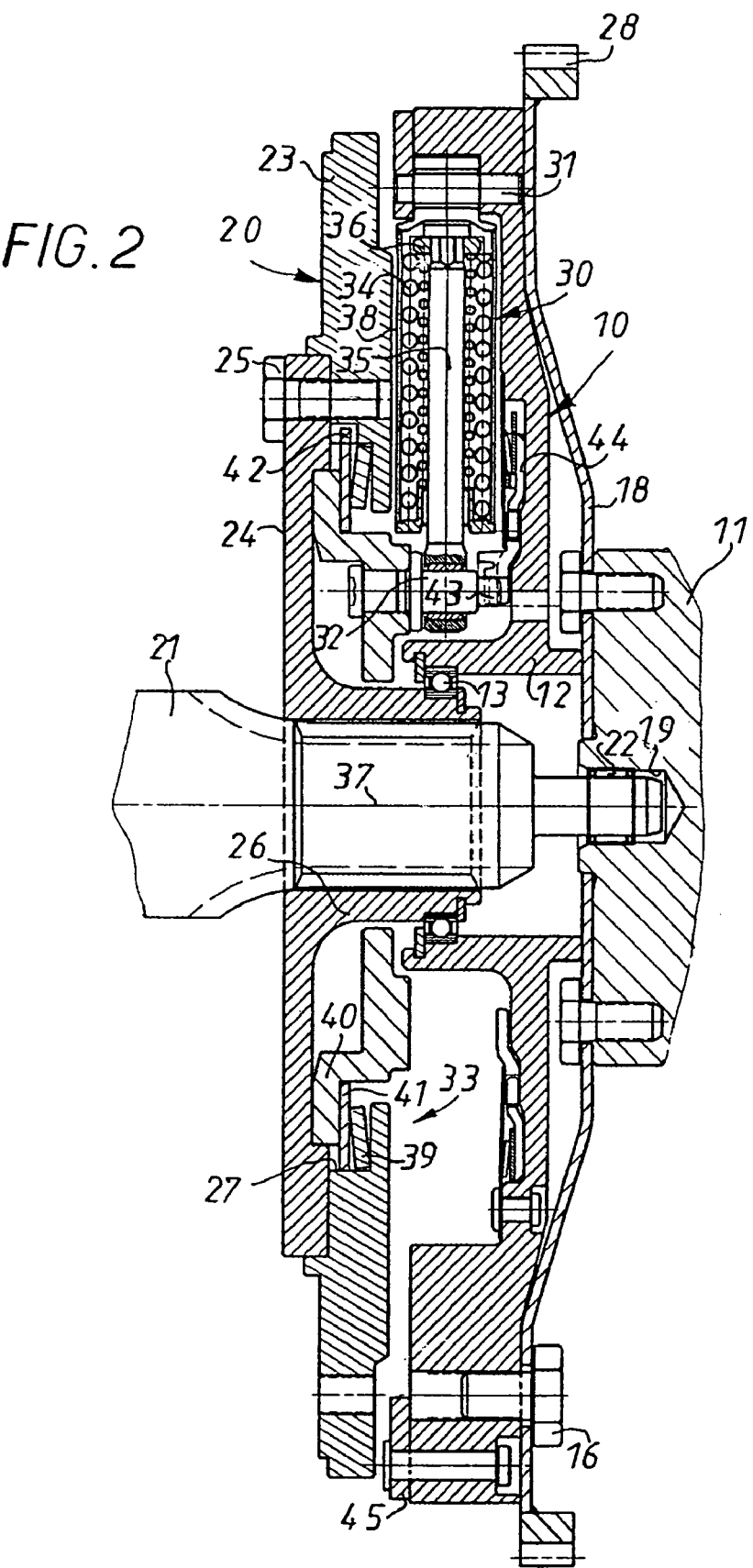
FIGS. 2 to 20 are additional cross sectional views of alternate embodiments of the present invention.

In the modified version in FIG. 2, the disc 15 constituting a cover plate has been omitted; the damper plate 18 is fixed directly to the primary flywheel 10 by the screws 16; the end of the driven shaft 21 is centred and guided in the pilot bearing 22, which in this case is disposed directly in the central bore 19 of the crankshaft 11.

Figure 3:
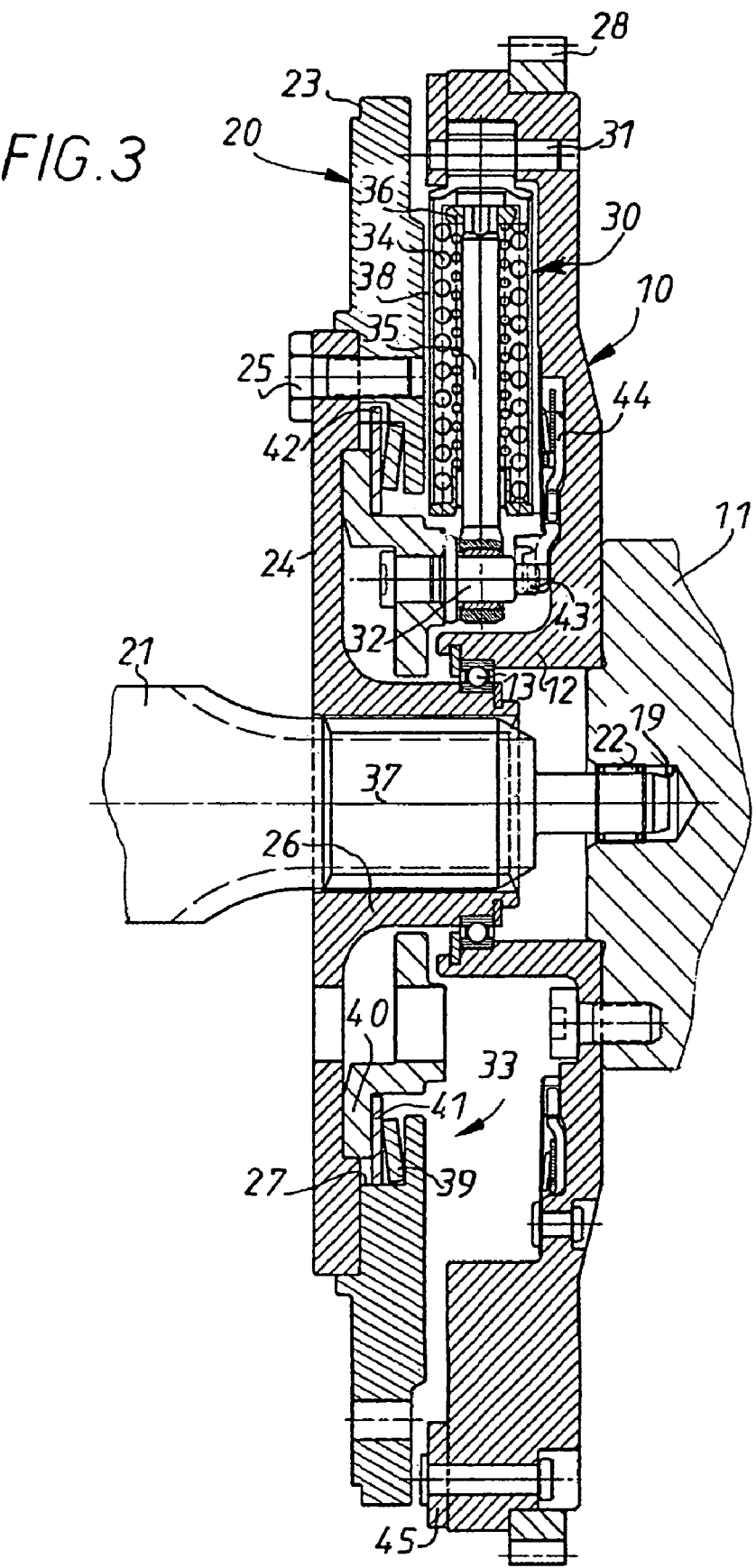

In the modified version shown in FIG. 3, the primary flywheel 10 is secured directly to the end of the crankshaft 11; it is the primary flywheel 10 that carries the starter crown 28 peripherally. In this example, as can be seen in the Figure, the inner part 24 of the secondary flywheel 20 and the friction ring 40 have holes aligned with each other, for the passage of screws for fastening the primary flywheel 10 on the driving shaft 11.

Figure 4:
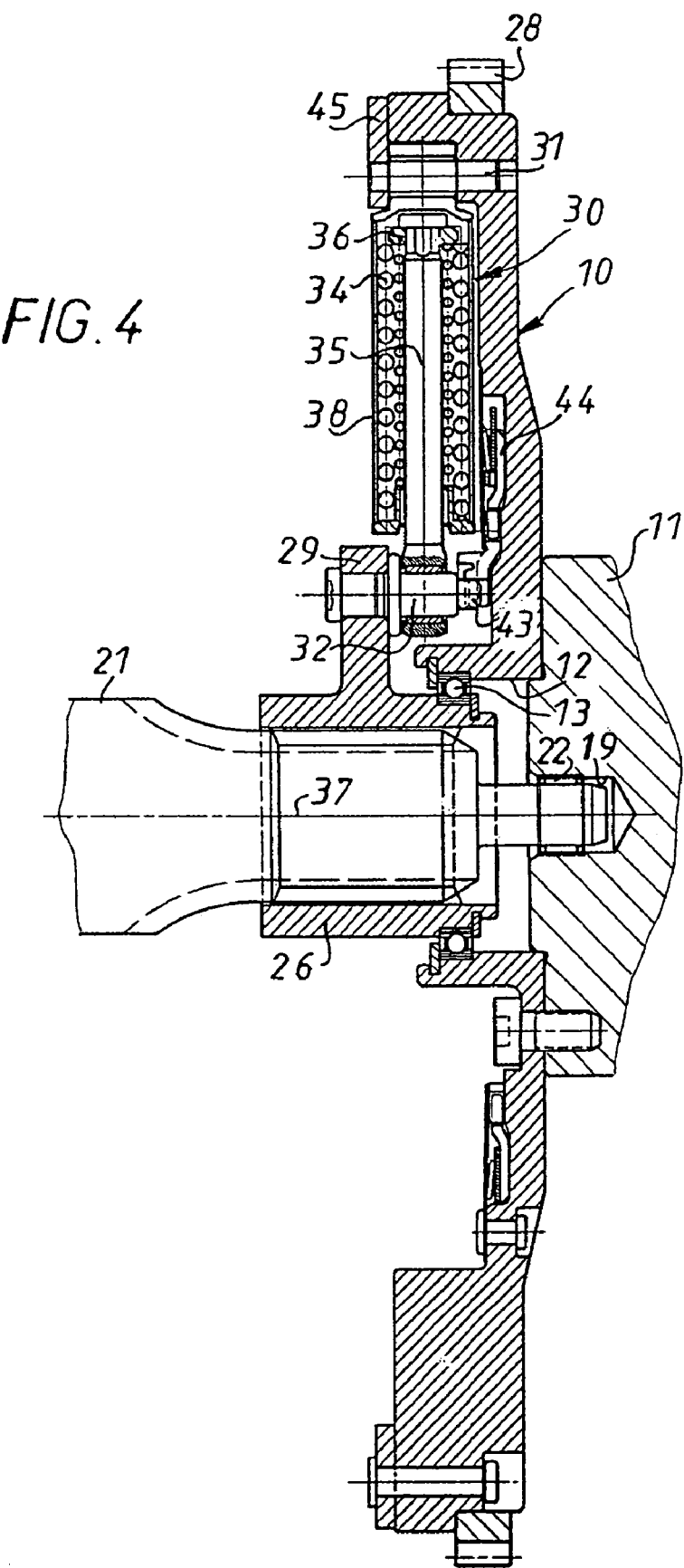

In the modified version in FIG. 4, the torque limiter 33 is omitted; the hub 26 is coupled directly to the output pivot pins 32 by means of radial arms 29; in this example the screws that fasten the primary flywheel 10 to the driving shaft 11 are easily accessible, the hub being reduced because of the absence of a secondary flywheel; the hub has no need to be located angularly with any precision in order, as above, to put holes into alignment with holes for the said screws.

Figure 5:
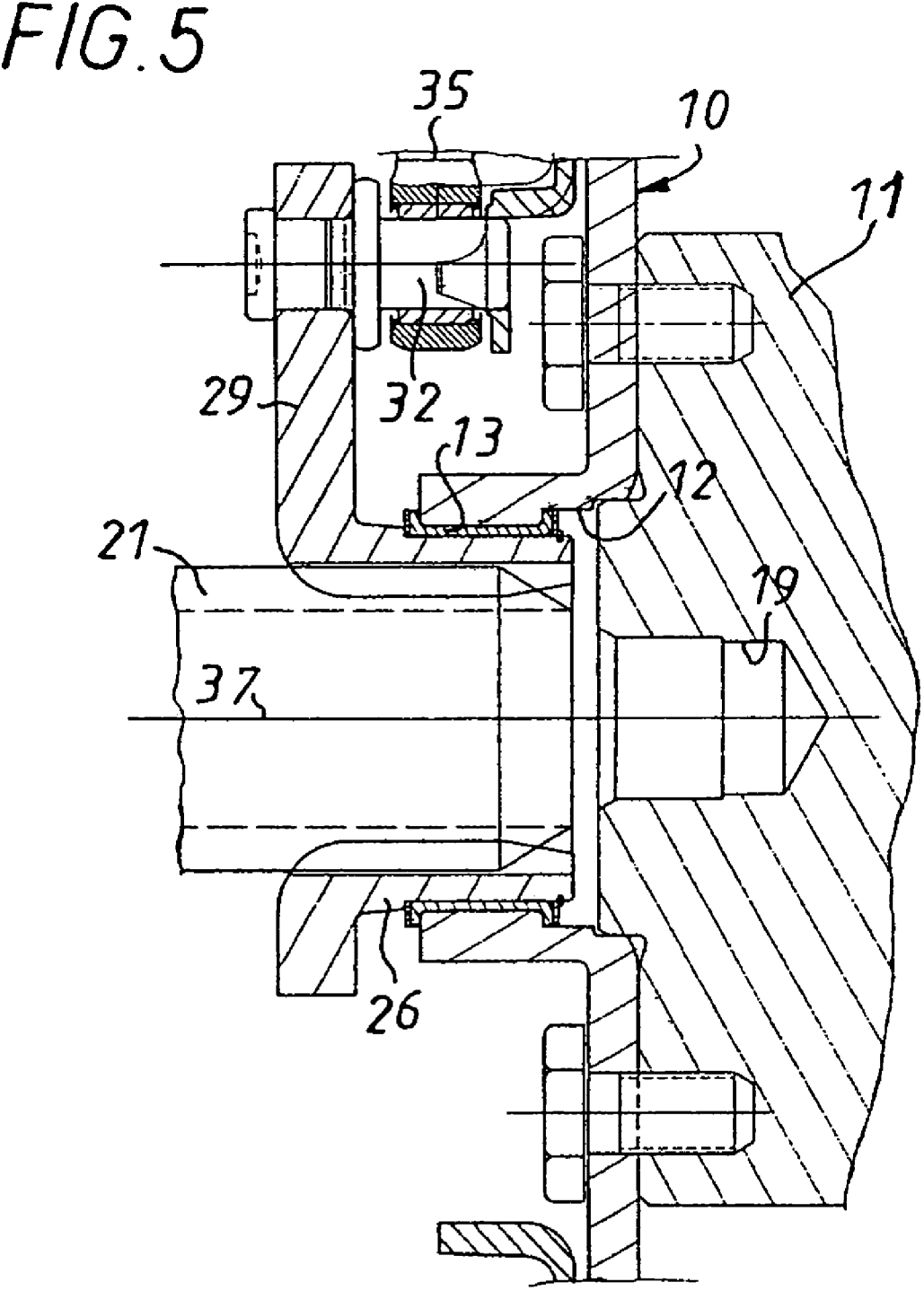

FIG. 5 shows a modified version in which the bearing 13 is a plain bearing disposed between two collars in the form of metal pressings facing each other, which are part of the hub 26 and the primary flywheel 10, both of them being fabricated in metal plate.

Figure 6:
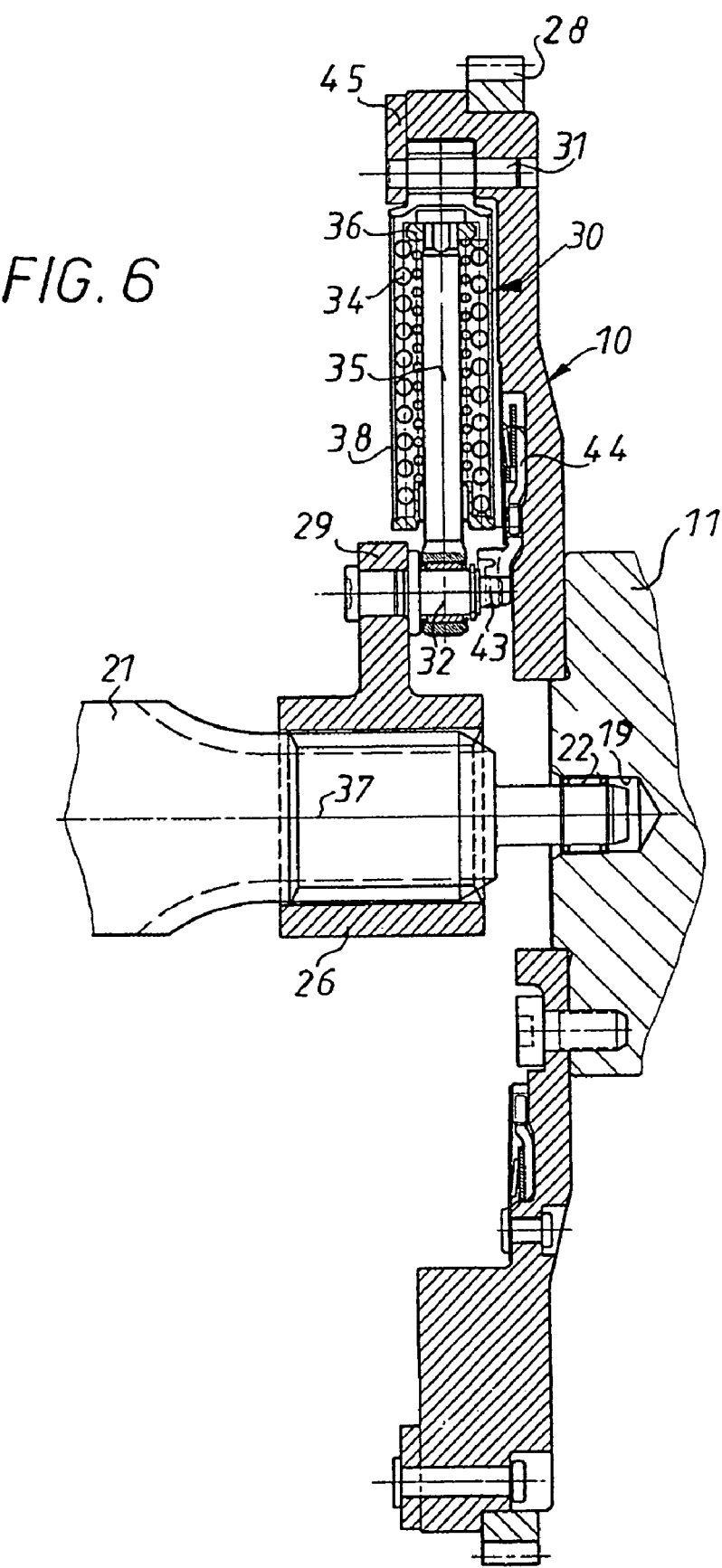

It is of course possible to omit the bearing 13 as shown in FIG. 6, in this case the hub 26 is centred by the driven shaft 21, which is itself centred by the pilot bearing 22 as in FIG. 2.

Figure 7:
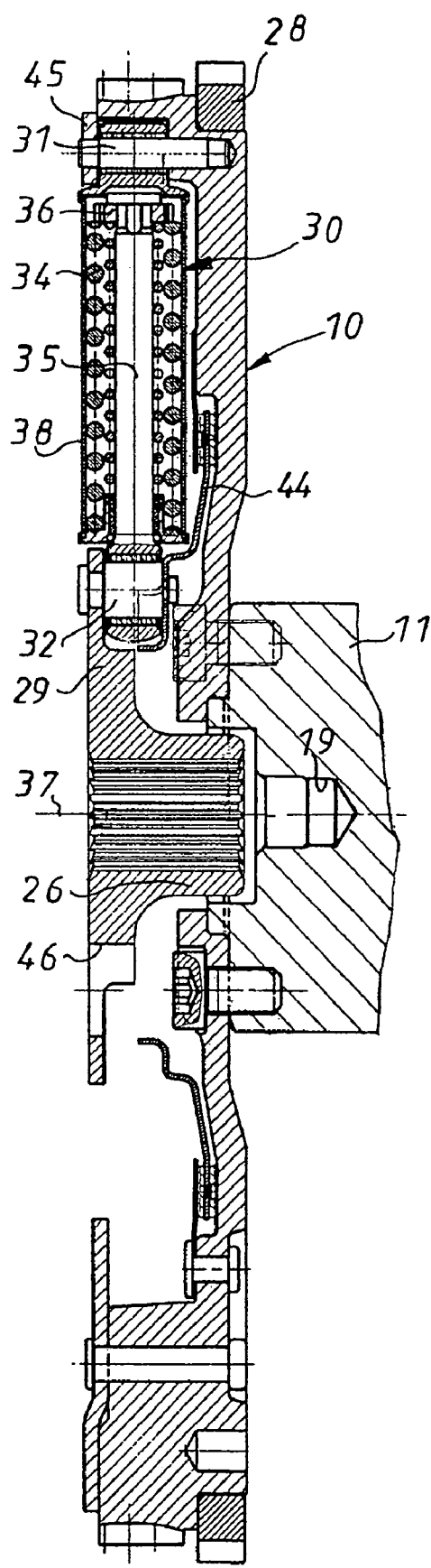

In FIG. 7, the friction ring 44 of the torsion damper 30 is secured to the hub 26 at the end of the output pivot pins 32 by riveting; in this example, the arms 29 which support the output pins 32 are part of a hub collar portion formed with access passages 46 for the fastening screws by which the primary flywheel 10 is secured on the driving shaft or crankshaft 11. In the following description, for reasons of convenience, the reference 29 designates one or more hub arms or a hub collar portion.

Figure 8:
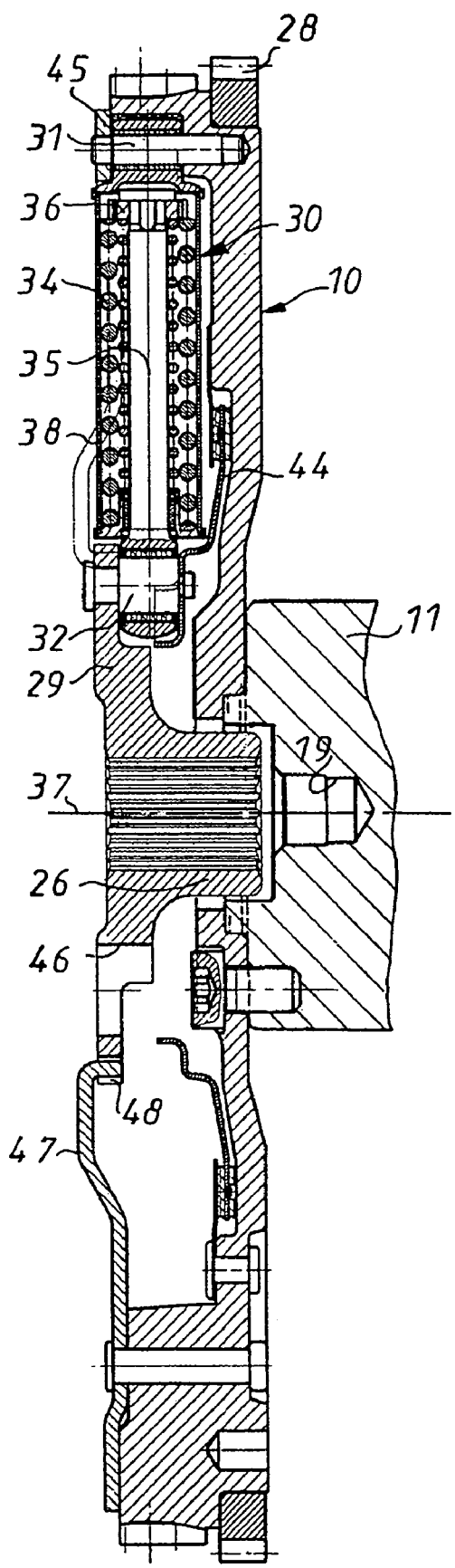

The primary cover plate 45 in FIG. 8 has radial lugs 47, the inner ends of which are in cooperation with the edges of slots 48 formed at the outer periphery of the hub collar portion 29, and thereby providing end stops for the circumferential displacement of the input means 31 and output means 32 of the torsion damper 30.

Figure 9:
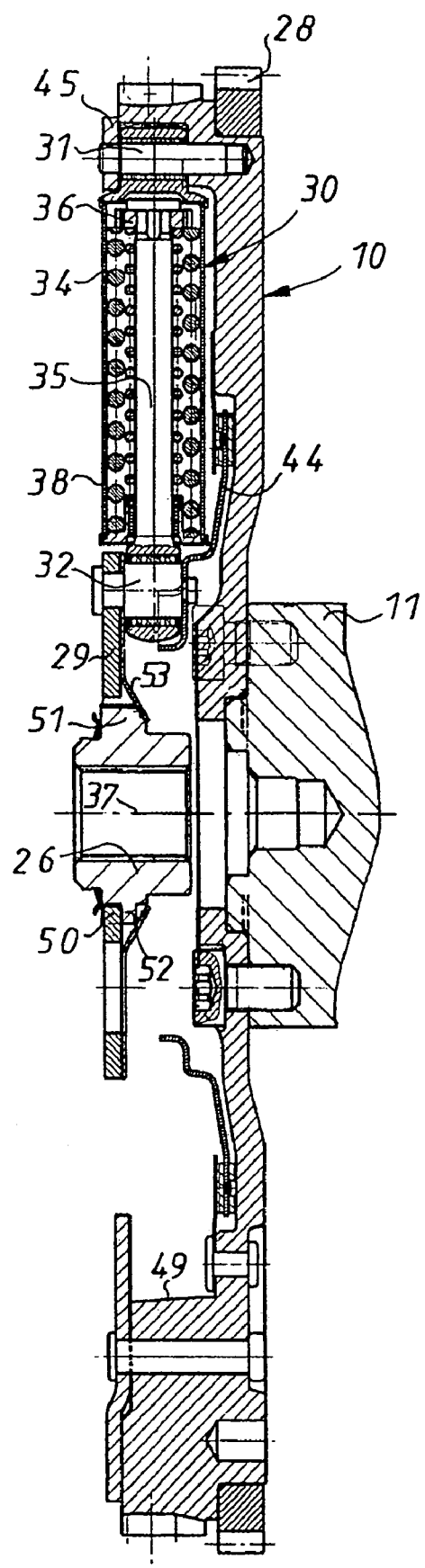

In order to compensate for any possible misalignments between the driving shaft 11 and driven shaft 21, it is possible, as is shown in FIG. 9, to mount the hub collar portion 29, which is fixed to the output means 32, and the hub 26 itself, elastically in the manner described in the document FR-A-2 808 850.

The inner periphery of the collar portion 29 is formed with a set of teeth 50 which meshes, substantially without any clearance, with an external set of teeth 51 of the hub 26 which is formed on a peripheral flange, the thickness of which, that is to say its axial dimension, is greater than that of the teeth 50 of the collar portion 29, with its outer diameter being greater than the peripheral inner diameter of the collar portion 29, that is to say the diameter at the base of the gaps between teeth of the internal set of teeth on the collar portion 29. Thus, the tips of the teeth 51 on the hub 26 are extended radially outwards, at an axial end of the flange on the hub 26, by fingers 52 which have an annular radial face on the side of the teeth 50 and an oblique face in the form of a frusto-conical sector on the opposite side; on the frusto-conical surface of the fingers 52 there is applied a frusto-conical flange formed at the inner periphery of an elastic ring 53, which is applied on the face of the collar portion 29 which faces towards the primary flywheel 10, and which is secured, like the latter, by riveting of the appropriate end of the output pivot pins 32.

In this way, the fingers 52 are gripped elastically between the collar portion 29 and the frusto-conical flange of the ring 53, which enables the relative positions of the collar portion 29 and hub 26 to be matched in order to compensate for any possible misalignments between the driving shaft 11, coupled to the collar portion 29, and the driven shaft coupled to the hub 26.

It will be seen in FIG. 9 that the primary flywheel 10 is formed with axial pads 49, as is also true in the foregoing versions, and these pads extend between the cans 38 of the torsion damper 30.

Figure 10:
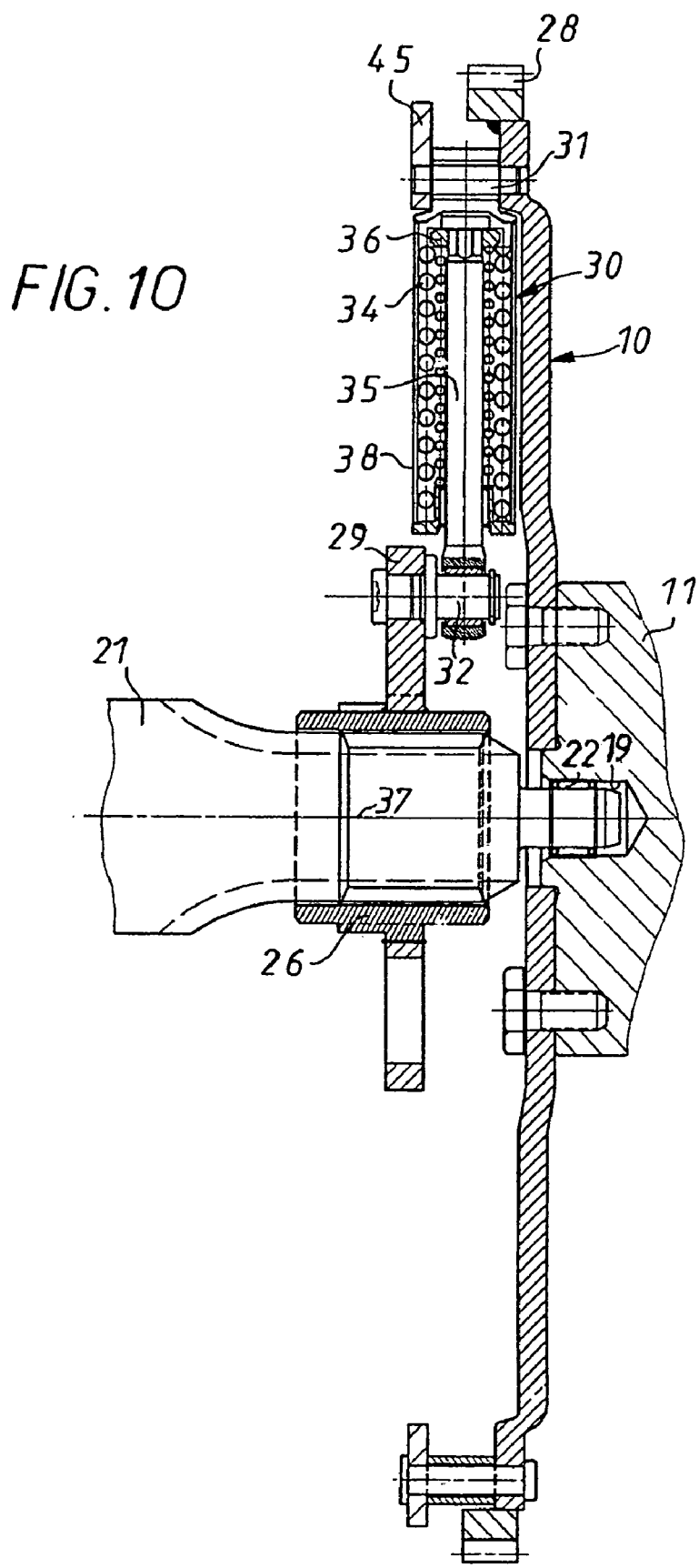

In FIG. 10, these pads 49 are omitted, as are the hysteresis means which consist in particular of the friction ring 44. In this example, the hub 26 is in two parts, the arms 29 which are part of a ring of metal plate fixed by welding to the hub; teeth at the inner periphery of this ring and at the outer periphery of the hub ensure good transmission of the torque between the two components.

Figure 11:
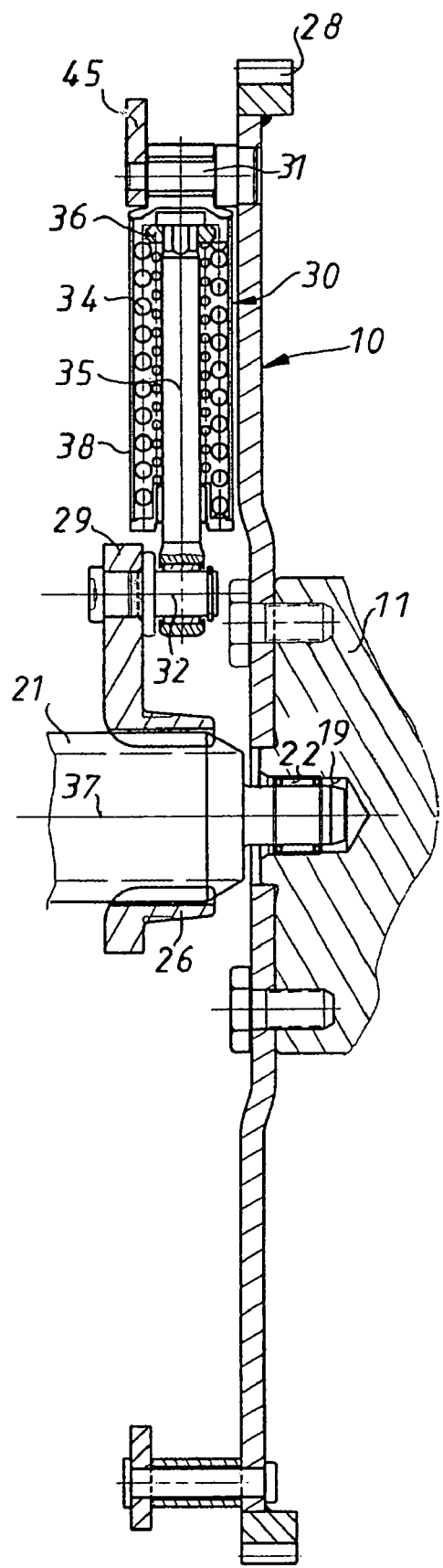

The modified version in FIG. 11 differs from that in FIG. 10 in that the hub 26 is a metal pressing and carries arms 29 which are integral with it, as in FIG. 5.

Figure 12:
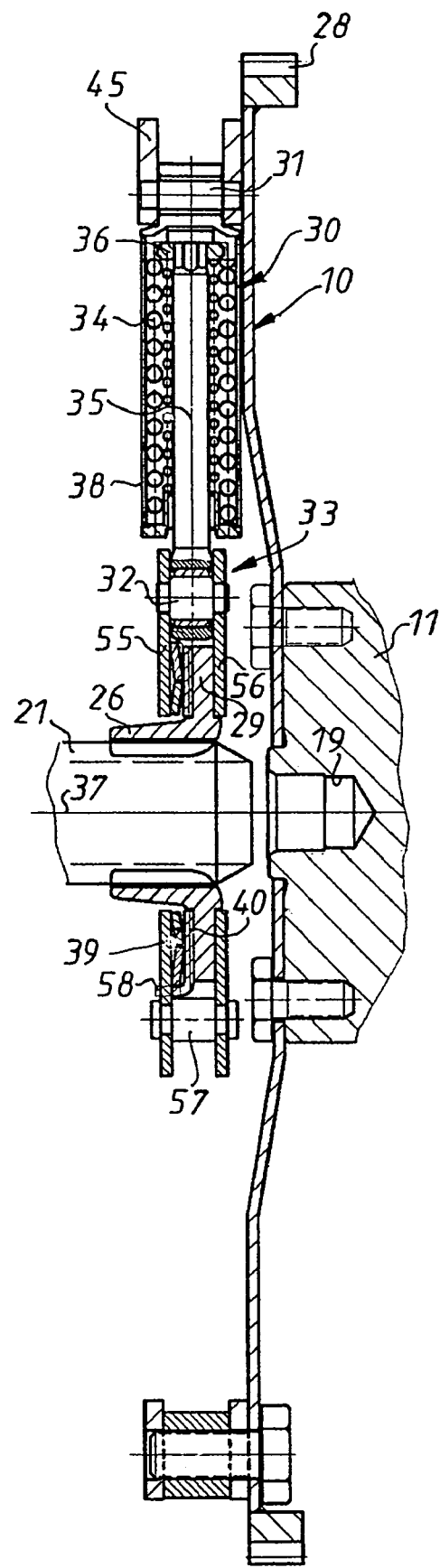

The hub 26 in the modified version shown in FIG. 12 is also made of metal plate and is integral with its circular collar portion 29; in this case, the collar portion 29 is in line with the rods 35 of the torsion damper 30, in such a way that the filter shown in FIG. 11 can be given a torque limiter; in this case the torque limiter consists of two transverse rings 55, 56 which lie axially on either side of the collar portion 29; they are assembled together by means of short axial posts 57 at their outer periphery, where they bear alternately on the output pivot pins 32.

The friction ring 40 of the torque limiter is disposed axially between the collar portion 29 and one of the rings of the limiter, in this case the ring 55, the spring ring 39 being placed between the friction ring 40 and the ring 55 of the limiter in such a way that it applies a friction force 40 against the facing surface of the collar portion 29. An axial lug 58 of the friction ring 40 extends through a hole in the ring 55 of the torque limiter so as to drive it in rotation.

Figure 13:
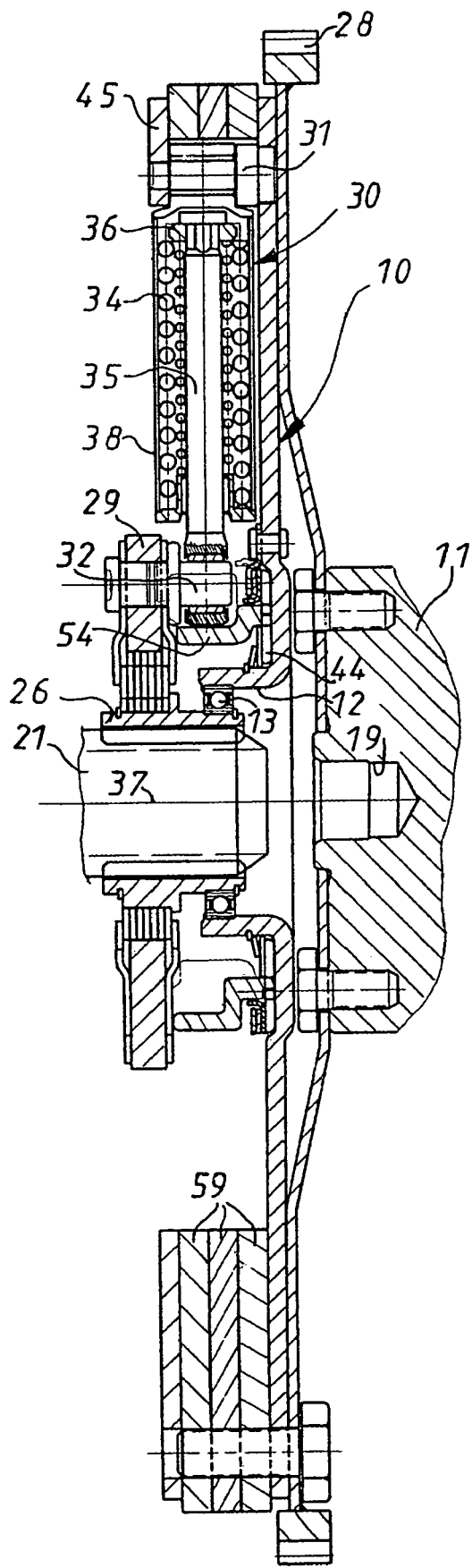

In FIG. 13, the torque limiter consists of discs which are coupled in rotation alternately, one disc to the hub collar portion 29 which supports the output pivot pins 32, and the next disc to the hub 26, and so on; in this case hysteresis means are provided: they consist of a friction ring 44 which is applied against the inner face of the primary flywheel 10, being driven in rotation by a sleeve 54 which is itself driven in rotation by the radially inner ends of the rods 35 that extend into outwardly open lateral depressions in the sleeve 54. A circumferential clearance between the sleeve 54 and the friction ring 44 leads to an angular offset of the hysteresis. In this version also, the mass of the primary flywheel 10 is augmented by crowns 59, which are cut out in such a way as to leave free the space which is necessary for displacement of the cans 38, while filling to the best advantage the space between these cans.

The filter in FIG. 14 works in oil, and is mounted in the manner of a hydraulic torque converter; the disc 15 of the primary flywheel 10 is in the form of a drum, and its volume is closed by a closure cover plate 59 which is fixed sealingly at its centre to a sleeve 60, which is used here to drive an oil pump; the nose 14 of the disc 15 can, as in FIG. 1, be used for centring the driven shaft 21; the torque limiter 33 is of the same type as that described with reference to FIG. 12. The cans 38 have been shown as in the previous versions, but they can of course be simplified, to contain no grease and not being welded sealingly. They may also not be cylindrical, for lateral guiding of the springs is sufficient: in that case, the material in the axial direction can be omitted and the axial size of the assembly reduced; similarly, in order to reduce the axial size of the assembly even more, it is possible to locate the pads with which the screws 17 for fastening to the damper plate 18 are in cooperation, circumferentially between the springs 34. The screws 17 may be reversed, that is to say fitted from left to right with reference to the Figure, the vibration filter being mounted on the engine from the front; in that case, corresponding nuts are welded on the damper plate 18 and the screws extend through holes which are provided sealed within the filter; such an arrangement reduces axial size. An axial channel 61 in the driven shaft 21 enables oil to be supplied to the vibration filter, with the return surrounding the shaft inside the sleeve 60; a radial channel 62 enables the filter to be purged so as to avoid formation of foam.

In this example the pivot pins 31 and 32 are positioned and held firstly by the primary cover plates 45 and secondly by a counter cover plate 63, both of which are in axial abutment against the drum disc 15 and the closure cover plate 59, the axial lugs 64 of the counter cover plate 63 being in abutment against the primary cover plate 45. The oil pump is driven by the crankshaft 11 through a central spindle 69 which extends through the driven shaft 21.

Figure 15:
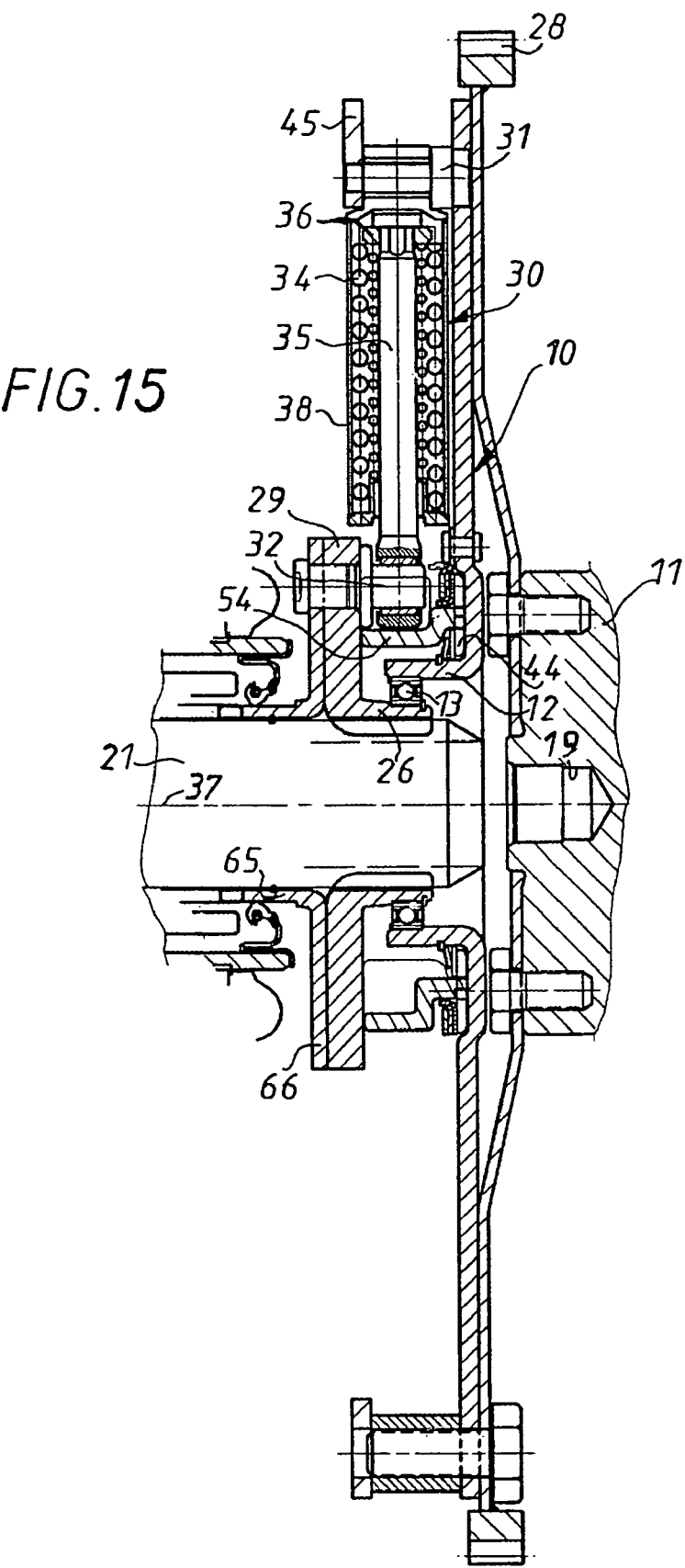
Figure 16:
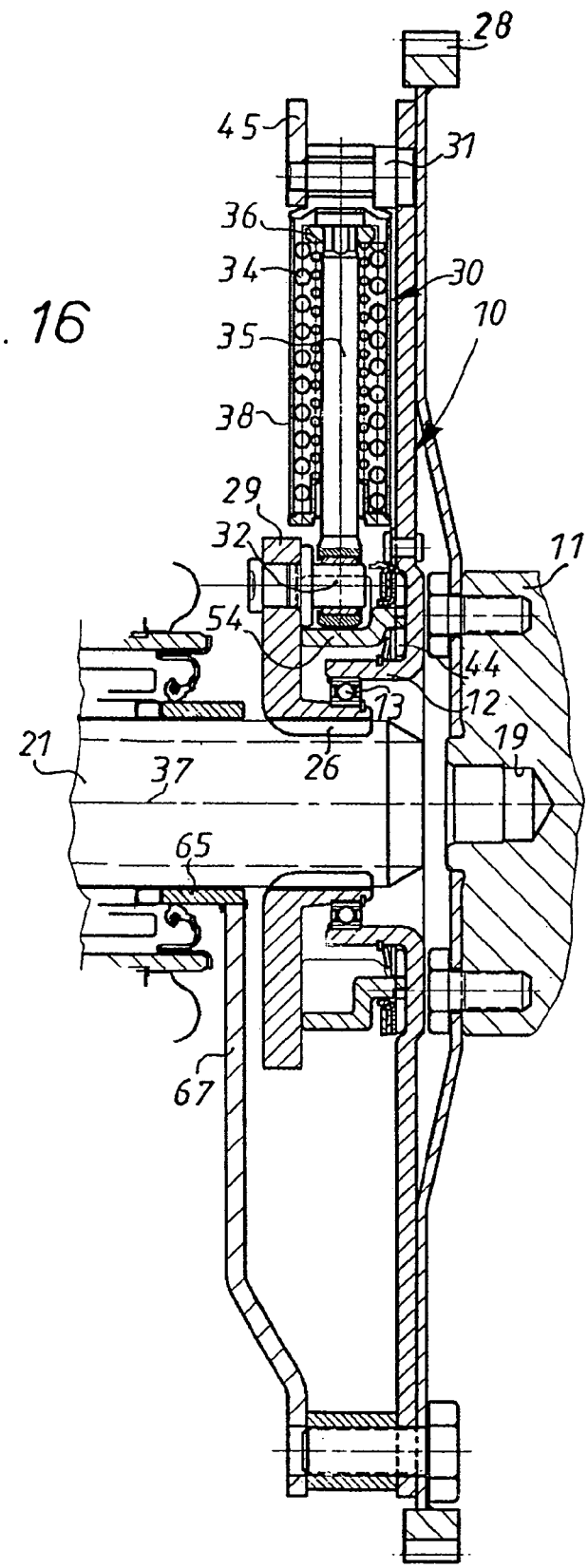

The vibration filter may be of the type which does not work in oil, and may be used to drive an oil pump, in particular for the purpose of lubricating the gearbox, and control of the brakes and clutches; in the version shown in FIG. 15, the oil pump is driven by a driving sleeve with a collar portion 66 which is secured to the output pivot pins 32 at the same time and in the same way by riveting as the hub collar portion 29; in FIG. 16, the driving sleeve 69 is coupled, in this case by welding, to radial arms 67 of the primary cover plate 45.

Thus, in FIGS. 15 and 16, the pump is driven after the vibrations have been filtered out, and, in particular in order to attenuate the resonance of the secondary on starting the engine, it is possible to use the pump to act as a brake on the hub 26; this braking effect is obtained by then loading the pump by the maximum amount, for example by demanding of it a large flow if it is of the variable geometry type.

Figure 17:
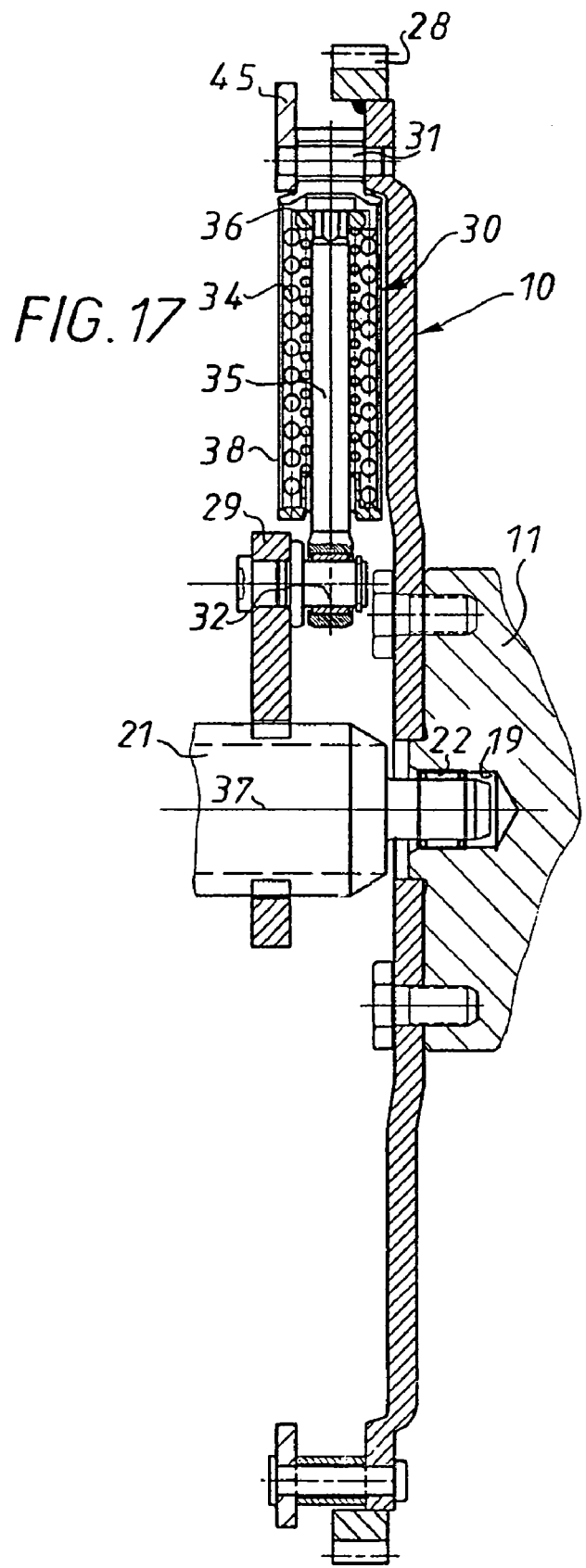
Figure 18:
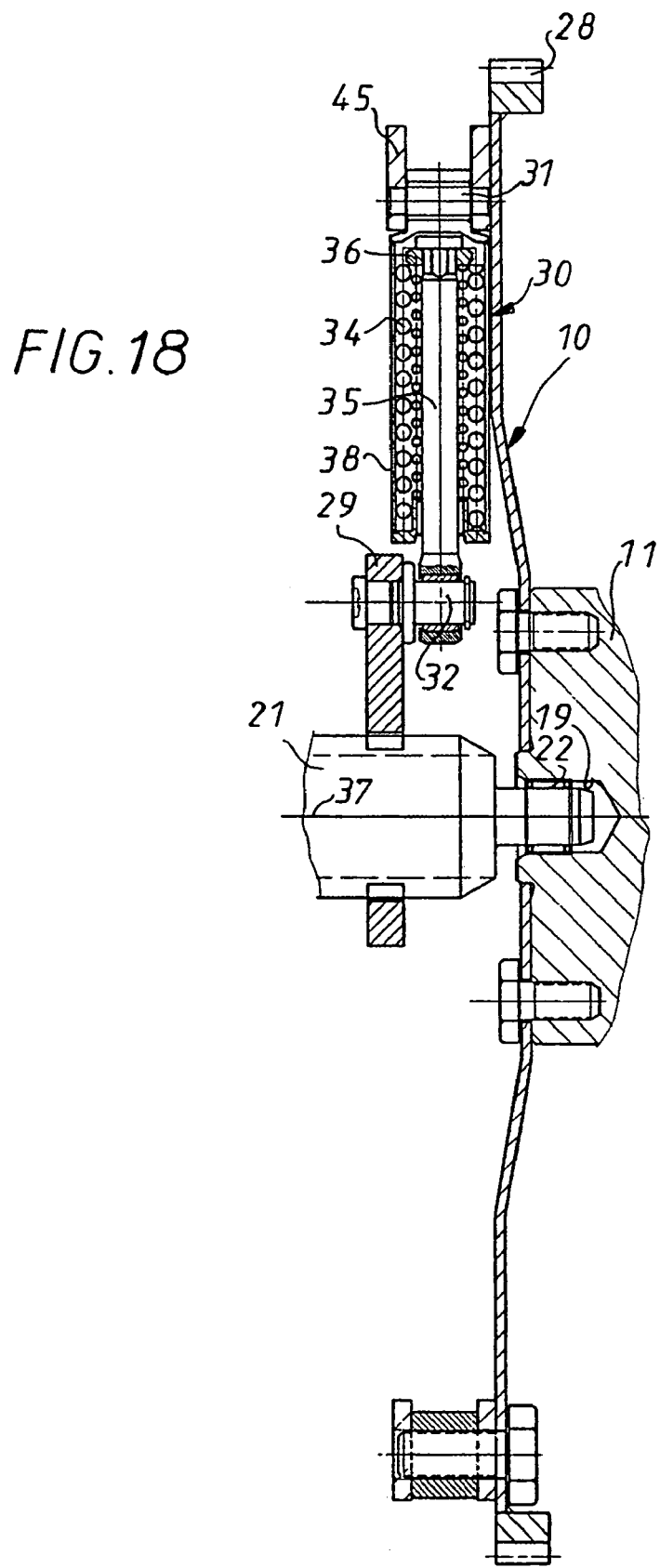
Figure 19:
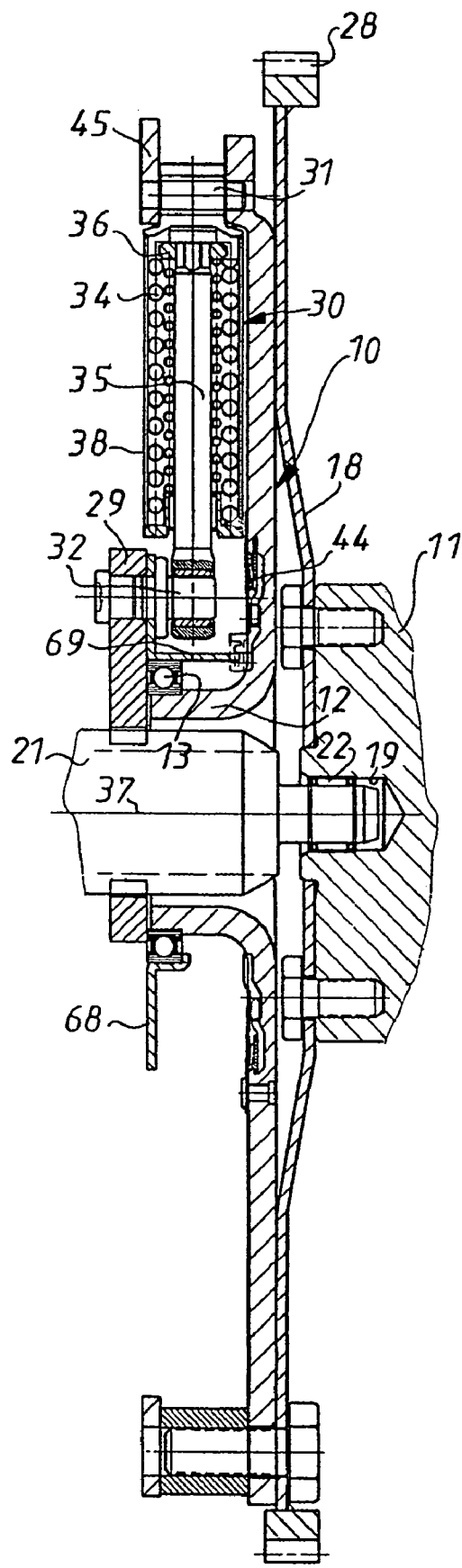

Low cost and economical solutions may be made, such as the versions in FIGS. 17 to 19; in FIG. 17, the hub proper does not exist, it being reduced to its collar portion having radial arms 29; in FIG. 17 the primary flywheel 10 is a rigid disc; in FIG. 18 it is a flexible disc; in FIG. 19, the primary flywheel 10 has an axial flange 12 which enables a bearing 13, in this case a ball bearing, to be arranged between the axial flange 12 and an axial flange which is also provided on a ring 68, which is fixed by riveting of the ends of the output pivot pins 32, to the said pins as well as the radial arms 29 of the collar portion; hysteresis means are also provided: these consist of a friction ring 44 which is driven in relative rotation by axial tongues 69 of the axial flange of the ring 68.

Figure 14:
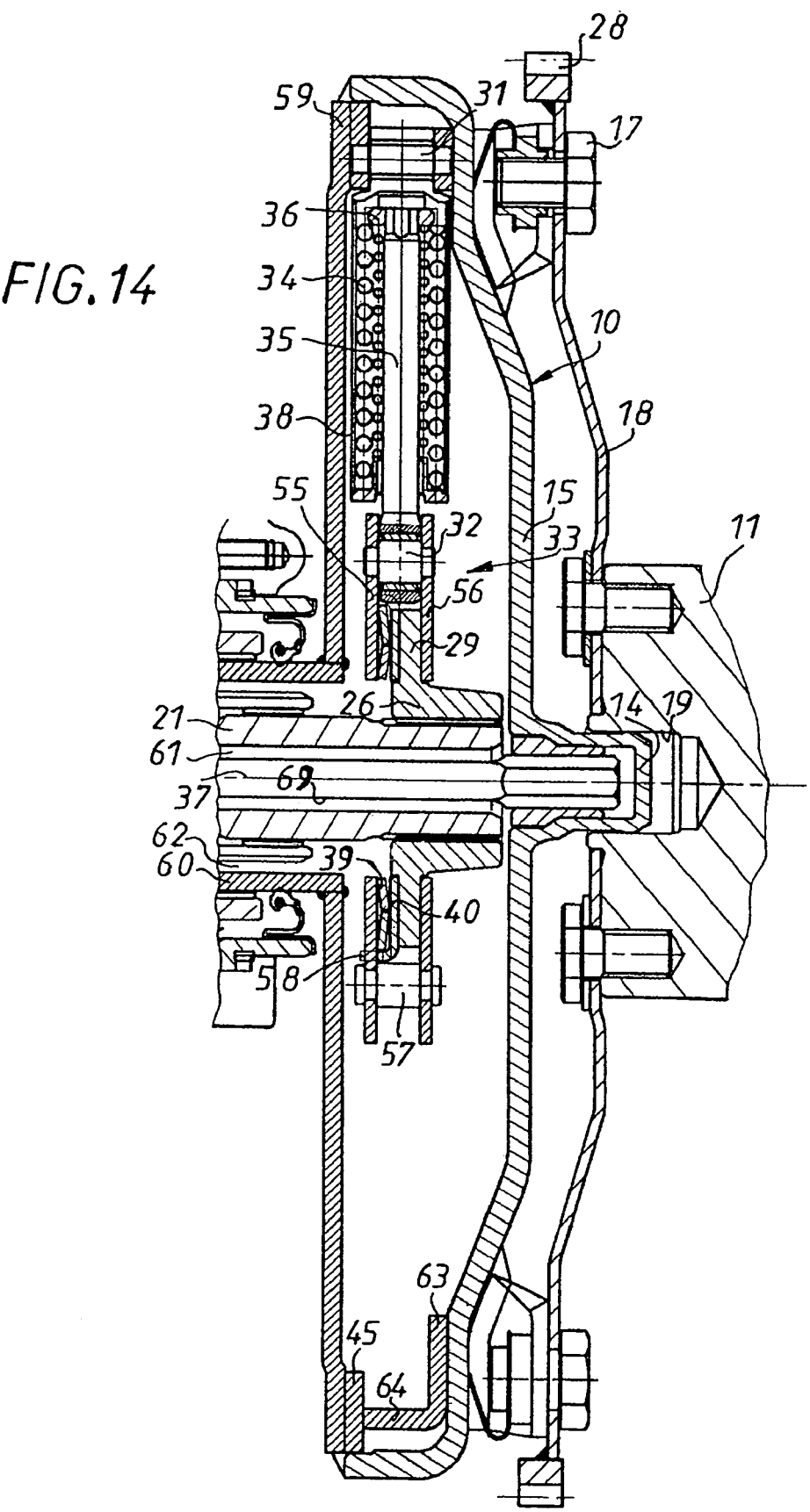
Figure 20:
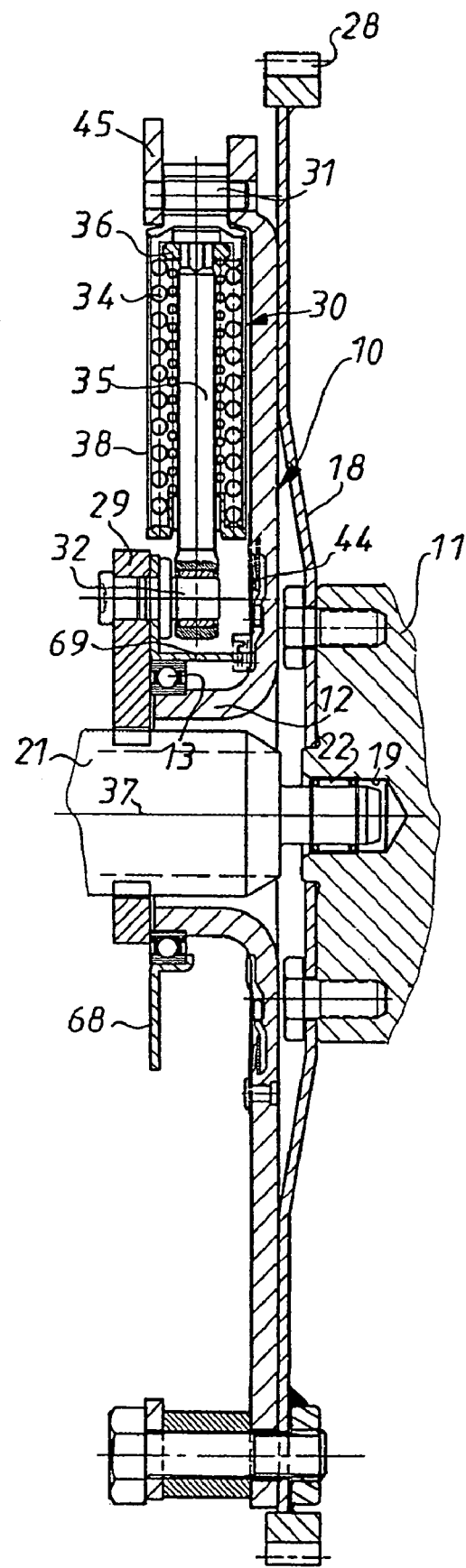

FIG. 20 is a modified version of FIG. 19; in this version, the screws which fasten the primary flywheel 10 on the damper plate 18, which is itself fixed on the driving shaft 11, have been reversed, as was previously done in respect of FIG. 14. In the present case, the nuts are welded on the damper plate 18 on the same side as the driving shaft 11, and the screws which, in parallel, secure the so-called primary cover plate 45 are fitted from left to right with respect to the Figure; thus, the damper plate 18 is first fitted on the driving shaft 11, and then the filter is fitted on the said damper plate 18; the said fastening screws are disposed between the cans 38 and can all be screwed down at the same, time using a screwdriver head.

Thus, the same vibration filter may be fitted either from the rear as in FIG. 19, or from the front as in FIG. 20, with respect to the end of the driving shaft 11, which makes it adaptable to the various methods which are used by vehicle builders.

In a further version not shown, the radial springs are springs which work in traction.

In a further version which is not shown, the vibration filter is associated with an electrical machine of the starter alternator type which is coupled to the primary flywheel, its inertia regulating to some extent the speed of the crankshaft, or else coupled to the secondary flywheel, its inertia then constituting the secondary inertia.

As can be seen, the invention proposes a vibration filter for an automatic transmission with automatic gear changing, which is either continuous, for example with belt drive or stepped drive, having a highly progressive stiffness, of the parabolic type, which leads, as is well known, to high quality vibration filtering: the stiffness is low at low torques, in slow running or in low torque running, and increases progressively in a parabolic manner until it reaches high stiffnesses at high torques, the springs never becoming fully closed up; the arrangement of the springs also avoids any stalling of the filter due to centrifugal force: in this connection, when subjected to such a force the springs are on radial abutments; the presence of a torque limiter enables the input and output shafts to be misaligned: when a spring is closed up, the two parts of the hub become relatively offset from each other and the shock is distributed equally over the three springs instead of only one. The flexible flywheel versions lead to an upward change in the natural frequencies of the crankshaft, and, due to a reduced mass beyond excitation frequencies of order 2 produced by the engine rotating at high speeds. The sealed version which works in oil constitutes a sub-assembly which can be mounted in the manner of a hydraulic torque converter, which applies constant greasing over time, where the oil is renewed without stopping, which again leads to good cooling of the bearings.

By contrast to a hydraulic torque converter in which the primary and secondary inertias are high due to the volumes necessary, the invention enables the vibration filter to be given primary and secondary inertias which are precisely matched to the requirements, in terms of engine balancing, gear ratios and vehicle mass.

Dilation of the metal plate at high speeds due to centrifugation of the oil in a hydraulic torque converter leads to an axial thrust on the crankshaft, which is not the case in a vibration filter according to the invention.

Having regard to the high flow needed for cooling a hydraulic torque converter, the oil pump is of large capacity and has associated temperature control; here, the vibration filter according to the invention is associated with a low consumption oil pump with a small volume or variable volume; an electric pump may be sufficient, as the brakes and the clutches do not consume oil all the time.

The invention claimed is:

1. A filter for a motor vehicle transmission with an automatic gearchange, including a torsion damper (30) disposed between an input element adapted to be driven in rotation by a crankshaft (11) of an engine of a motor vehicle, and an output element adapted to be directly coupled to an input shaft of the transmission or driven shaft (21), the torsion damper including elastic means, the stiffness of the damper is variable, the output element comprising a central hub (26) for coupling to the driven shaft (21) and a collar portion (29) of the hub (26) being mounted elastically with respect to the hub (26), the torsion damper (30) being connected at one end thereof to the input element and at the other end thereof to the output element, the output element being centered by the driven shaft (21), the collar portion (29) being formed with a set of teeth (50) in mesh with a set of outer teeth (51) of the hub (26).

2. The filter according to claim 1, wherein the variable stiffness is obtained with resilient means in the form of helical springs (34) oriented substantially radially.

3. The filter according to claim 2, wherein the helical springs (34) are mounted on rods (35), the outer ends of which include abutment seatings (36) for the springs (34), with their inner ends being articulated on pivot pins (32) constituting the output means of the torsion damper (30).

4. The filter according to claim 3, wherein the helical springs (34) are contained in cans (38), outer ends of which are articulated on pivot pins (31) constituting input means of the torsion damper (30).

5. The filter according to claim 4, wherein one end of the input pivot pins (31) is supported by an annular primary cover plate (45).

6. The filter according to claim 5, wherein the collar portion is formed as radial arms (29) which are coupled to the output pivot pins (32).

7. The filter according to claim 6, wherein the friction ring (44) of the torsion damper (30) is fixed to the hub (26) at the end of the output pivot pins (32).

8. The filter according to claim 6, wherein the outer teeth (51) of the hub (26) being extended radially outwards so as to constitute fingers (52) which are gripped elastically between the collar portion (29) and a resilient ring (53) applied and secured to the collar portion (29).

9. The filter according to claim 1, wherein the hub (26) is centered only by the driven shaft (21).

10. The filter according to claim 1, wherein the torsion damper (30) includes friction means.

11. The filter according to claim 10, wherein output pivot pins (32) of the torsion damper (30) constitute means for driving in rotation friction rings (44) which are applied elastically against the face of the primary flywheel (10) which faces towards the secondary flywheel (20).

12. The filter according to claim 1, wherein the torsion damper (30) is connected to the collar portion (29) of the central hub (26) of the output element at the other end thereof.

* * * * *